United States Patent Office 3,216,340
Patented Nov. 9, 1965

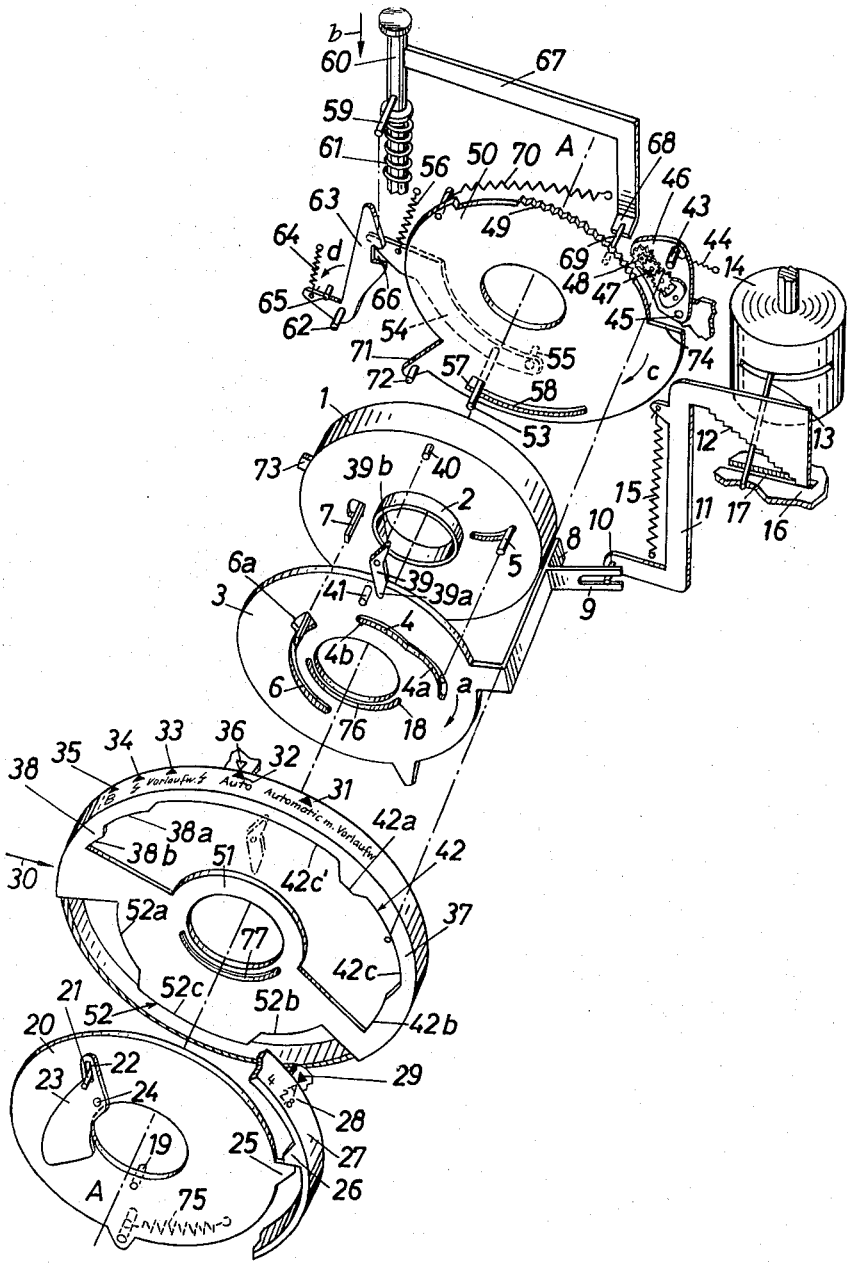

3,216,340
CAMERA CAPABLE OF BEING SELECTIVELY OPERATED IN A PLURALITY OF DIFFERENT WAYS
Fridolin Hennig, Munich, Germany, assignor to Agfa Aktiengesellschaft, Leverkusen-Bayerwerk, Germany
Filed May 16, 1962, Ser. No. 195,285
Claims priority, application Germany, May 25, 1961, A 37,525
8 Claims. (Cl. 95—53.3)

The present invention relates to cameras.

More particularly, the present invention relates to cameras which may be optionally set either automatically or manually and which include self-timers enabling the tripping of the shutter to be delayed for a given number of seconds so that, for example, the operator of the camera after placing the latter on a suitable support may include himself in the photograph.

It is a primary object of the present invention to provide a camera of this type with a structure which makes it very easy for the operator to set the self-timer into or out of operation.

A further object of the present invention is to provide a structure of this type which is extremely simple while at the same time making it very easy for the operator to know whether or not the self-timer is rendered operative, as contrasted with conventional cameras where a separate lever or the like must be manipulated to set the self-timer into or out of operation and where the operator through forgetfulness may leave the self-timer in its operative position even though this is not desired.

It is still another object of the present invention to provide a camera of the above type with a structure enabling the operator to select from one of a plurality of different types of operation, and among the selected types of operation are included operation with or without the self-timer.

With these objects in view the invention includes, in a camera, a manually operable selecting means for selecting one of a plurality of different types of operation, the camera also including a self-timer means which is movable between operative and inoperative positions, and in accordance with the present invention the manually operable selecting means cooperates with the self-timer means for placing the latter in its operative or in its inoperative position, and thus the selecting means which selects the particular type of camera operation desired by the operator also is capable of rendering the self-timer operative or inoperative.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one possible embodiment of a structure according to the present invention is shown in an exploded perspective view.

Referring to the drawing, there is shown therein a housing 1 through which the optical axis A—A centrally passes, this housing 1 serving to house the shutter blades as well as the drive for the shutter blades and the retarding mechanism which determines the exposure time in a manner well known in the art. The housing 1 coaxially carries a tubular portion 2 which serves to support for rotary movement the exposure time setting ring 3. The exposure time setting ring 3 is formed with an elongated camming slot 4 which determines the exposure time, and this slot 4 receives a pin 5 which is operatively connected in a known way to the retarding mechanism within the housing 1, so that in accordance with the angular position of the ring 3 the camming slot 4 thereof will locate the pin 5 in a position providing a given exposure time. The ring 3 is also formed with an arcuate slot 6 receiving the lever 7 which is available for bulb exposures, which is to say exposures whose time is determined solely by the operator, and the lever 7 will provide such bulb exposures in a manner well known in the art.

The ring 3 fixedly carries an arm 8 which may be formed integrally with the ring 3 and which extends parallel to the optical axis, and this arm 8 itself fixedly carries or is formed integrally with a bifurcated extension 9 which receives the pin 10 which is fixed to the scanning member 11 which is guided for movement in a vertical plane and which is provided with a stepped scanning edge 12 which cooperates with the pointer 13 of the galvanometer 14 which is operatively connected to a photocell, photosensitive resistor, or the like, so that the position of the pointer 13 is determined by the lighting conditions. A spring 15 urges the scanning plate 11 downwardly and the pointer 13 moves over a plate 16 which is stationary and located just beneath the pointer 13 so as to support the pointer 13 and limit the downward deflection thereof when the pointer is engaged by the scanning edge 12, the plate 11 being movable in a slot 17 which is formed in the plate 16.

The exposure time setting ring 3 is also formed with an arcuate slot 76 located along a circle whose center is in the optical axis and having an end 18, this slot 76 receiving a pin 19 which is moved when the end 18 of the slot 76 engages the pin 19. Thus, when the ring 3 turns in the direction of the arrow $a$, the end 18 of the slot 76 will, after a given turning of the ring 3, engage the pin 19 and then turn the latter in the direction of the arrow $a$. This pin 19 is fixed to a diaphragm-setting ring 20 which is also supported for rotary movement about the optical axis. The pin 19 also passes through an arcuate slot 77 extending along an arc of a circle whose center is in the optical axis, and this slot 77 is formed in a manually operable selecting means 30 described in greater detail below. The diaphragm ring 20 fixedly carries a plurality of pins 21 which respectively pass through slots 22 which are respectively formed in the several diaphragm blades 23, and these blades 23 are respectively formed with the openings 24 which receive stationary pivot pins which are not illustrated and which support the several blades 23 for turning movement so as to determine the exposure aperture, only one blade 23 and the structure cooperating therewith being shown in the drawing for the sake of clarity.

In order to be able to manually set the diaphragm, the ring 20 is provided with a radial extension 25, and a spring 75 is connected at one end to a pin which is fixed to the ring 20 and at its opposite end to a stationary member of the camera so that the spring 75 urges the ring 20 to turn in a counterclockwise direction, as viewed in the drawing. The projection 25 is thus urged by the spring 75 into engagement with a projection 26 which extends inwardly and radially from a manually turnable ring 27 which is accessible to the operator for manually setting the diaphragm, and the ring 27 carries at its exterior a scale 28 of diaphragm-settings as well as a symbol indicating the position of the diaphragm ring 27 for automatic operation of the camera, this scale 28 as well as the symbol for automatic operation cooperating with a stationary index 29.

The manually operable selecting means 30 is in the form of a ring which is coaxial with the rings 20 and 3 and which is also turnable about the optical axis. The ring 30 carries at its outer periphery the several symbols 31–35 which indicate different types of operation which may be chosen by the operator, the symbol 31 indicating automatic setting with the use of the self-timer, the symbol 32 indicating automatic setting without the use of the self-timer, the symbol 33 indicating operation with flash exposure and with the self-timer, the symbol 34 indicating operation with flash exposure but without the self-timer, and the symbol 35 being the B position which indicates the position for bulb exposure. The several symbols 31–35 cooperate with a stationary index 36.

The ring 30 has a peripheral portion 37 having a camming section 38 made up of the camming steps 38a and 38b. The camming section 38 of the ring 30 cooperates with a lever 39 which is supported for turning movement by a stationary pin 40 which is carried by the housing 1. The arrangement of the lever 39 is such that in both of the positions of the ring 30 for automatic setting of the camera, these positions being indicated by the symbols 31 and 32, the pin 41 which is carried by the ring 3 can move freely past the lower end portion 39a of the lever 39 when the ring 3 turns in the direction of the arrow a, and of course when the ring 3 turns in the opposite direction also, while when the camming step 38a engages the upper end 39b of the lever 39, this lever 39 is turned in a clockwise direction, as viewed in the drawing, to a position where it engages the pin 41 so that the ring 3 will then be unable to turn in the direction of the arrow a. When the ring 30 is turned to the position where the camming step 38b engages the end 39b of the lever 39, the end 39a thereof not only remains in engagement with the pin 41, but in addition the lever 39 turns so as to act through the pin 41 on the ring 3 for displacing the latter positively in a direction opposite to that indicated by the arrow a through a relatively slight angular distance from the position shown in the drawing.

The inner peripheral portion 37 of the ring 30 is also provided with a camming edge 42 which is engaged by a pin 43 which is urged against the camming edge 42 by a spring 44. The pin 43 forms part of the self-timer means which includes also a plate 46 which carries the pin 43 and which is supported by a stationary pivot pin 45 for turning movement between operative and inoperative positions, the self-timer means including the train of retarding gears 47 which terminate in a mechanism such as the escapement wheel and anchor illustrated in the drawing. In this way the self-timer means is supported for movement between operative and inoperative positions, and the self-timer means is shown in its inoperative position where the pin 43 engages the camming portion 42c of the camming edge 42, this camming edge 42 including also the portions 42a and 42b located closer to the optical axis than the portion 42c and there is an additional portion 42c' at the same distance from the optical axis as the portion 42c. In the illustrated position of the parts where the self-timer means is in its inoperative position with the pin 43 engaging the camming edge portion 42c, the pinion 48 which forms the first gear of the train of gears 47 is spaced from the toothed portion 49 of a control means 50 which is also in the form of a ring supported for rotary movement about the optical axis A—A. When the manually operable selecting means 30 is turned to a position locating either the camming edge portion 42a or the camming edge portion 42b in engagement with the pin 43, the self-timer means is displaced about the pin 45, which forms a support means for the self-timer means, to an operative position where the pinion 48 engages the toothed portion 49 of the rotary control means 50. The web portion 51 of the manually operable selecting means 30 is formed with an additional camming portion 52 for controlling the position of a pin 53 which is carried by a lever 54 which forms with the pin 53 a releasable holding means for the control means 50, this pin 53 extending through an arcuate slot 58 located along a circle whose center is in the optical axis, and this slot 58 communicates at its left end, as viewed in the drawing, with a cutout 57 which extends from the slot 58 inwardly toward the optical axis, so that when the pin 53 is located in the cutout 57 closer to the optical axis than the slot 58 the ring 50 will be unable to turn in a direction of the arrow c, and thus in this position the releasable holding means 53, 54 is in its holding position releasably holding the control means 50 against turning movement in the direction of the arrow c. The lever 54 is supported for turning movement by a stationary pivot pin 55 and is urged in a clockwise direction by a spring 56 which thus continuously urges the pin 53 into engagement with the camming edge 52 of the ring 30. As long as the camming edge portion 52c of the camming edge 52 engages the pin 53, this pin 53 is located at the same distance from the optical axis as the slot 58 so that the releasable holding means 53, 54 is thus maintained in its release position releasing the ring 50 for turning movement, while when the selecting means 30 is turned to a position aligning either the camming edge portion 52a or the camming edge portion 52b with the pin 53, these edge portions being located closer to the optical axis than the camming edge portion 52c, the spring 56 will be capable of turning the lever 54 to a position which locates the pin 53 in the cutout 57 and thus releasably holding the control means 50 against turning movement.

The free end portion of the lever 54 which is distant from the pivot pin 55 is located in the path of downward movement of a pin 59 which together with the rod 60 and an arm 67 fixed thereto forms a manually operable release means, this rod 60 being guided by any suitable bearings for vertical movement, and the rod 60 is movable from the illustrated rest position thereof downwardly in the direction of the arrow b. As will be apparent from the description which follows, the operator, when moving the rod 60 downwardly from the starting position thereof shown in the drawing, releases through the rod 60 the automatic structure for automatically setting the camera. A spring 61 continuously urges the rod 60 of the manually operable release means back toward its starting position shown in the drawing. When the rod 60 is moved downwardly by the operator from the illustrated starting position in opposition to the spring 61, the pin 59 of the manually operable release means will engage the lever 54 so as to turn the latter in opposition to the spring 56 through a distance sufficient to displace the pin 53 from the cutout 57 and into alignment with the slot 58 so that in this way the manually operable release means 59, 60 is also capable of placing the releasable holding means 53, 54 in its release position releasing the control means 50 for turning movement in the direction of the arrow c.

An additional releasable holding means is formed by the lever 63 which is supported for turning movement by the stationary pivot pin 62, a spring 64 urging the lever 63 to turn in a clockwise direction, as viewed in the drawing, into engagement with a stationary pin 65 which holds the lever 63 in the position thereof illustrated in the drawing, this lever 63 being formed with the notch 66. The upper right edge portion of the lever 63, as viewed in the drawing, is also located in the path of downward movement of the pin 59 of the manually operable release means, and when the rod 60 is moved downwardly from the starting position shown in the drawing to a given end position, the pin 59 turns the lever 63 in the direction of the arrow d until the notch 66 becomes aligned with the pin 59 whereupon the spring 64 returns the lever 63 to the illustrated position with the pin 59 received in the notch 66 so that in this position the lever 63 forms a releasable holding means releasably holding the rod 60 in the end position to which it is moved by the operator from the starting position shown in the drawing.

The arm 67 which is fixed to the rod 60 and which forms part of the manually operable release means has a free end portion 68 which extends horizontally from the vertical plane in which the remainder of the arm 67 is located, the rod 60 being prevented from turning about its axis so that the arm 67 always remains in its own vertical plane of movement, and this end portion 68 of the arm 67 is engaged at its upper face by a pin 69 which is fixed to the ring 50 which forms the control means of the illustrated assembly, a spring 70 being operatively connected to the ring 50 so as to urge the latter to turn in the direction of the arrow c, so that in this way the pin 69 which is fixed to the ring 50 is maintained in engagement with the portion 68 of the arm 67.

In addition, the control means 50 is formed with an extension 71 which is located in the same plane as the lever 63 and which engages the lever 63, after the ring 50 turns sufficiently from the illustrated rest position thereof, so as to turn the lever 63 in opposition to the spring 64 in the direction of the arrow d for releasing the pin 59 so that the manually operable release means can then be returned by the spring 61 to its starting position. The extension 71 fixedly carries a pin 72 which extends parallel to the optical axis, and in the path of turning movement of the pin 72 is located the shutter-tripping lever 73 which is turned by the pin 72 for tripping the shutter, so that the control means 50 is movable from the illustrated rest position to a shutter-tripping position where the pin 72 actuates the shutter-tripping lever 73 in a manner well known in the art, and immediately thereafter the extension 71 will engage the lever 63 for releasing the pin 59 as described above. The ring 50 is furthermore formed with a substantially radially extending shoulder 74 against which the free end portion of the arm 8 is pressed by the spring 15 in the position of the parts illustrated in the drawing.

It will be noted that in the illustrated position of the manually operable selecting means 30, the symbol 32 is aligned with the index 36 so that the camera has been set for automatic operation without the use of the self-timer means. In order to make an exposure with the parts in this position, assuming that a new, unexposed film frame has been moved into the picture-taking position and that the shutter has been cocked, the operator will manually move the manually operable release means 59, 60, 67 in the direction of the arrow b from the illustrated starting position thereof to the end position referred to above. This movement of the manually operable release means will of course result in downward movement of the end portion 68 of the arm 67, so that as the arm 67 moves downwardly the spring 70 turns the control means 50 in the direction of the arrow c and the pin 69 follows the downward movement of the arm 67. The pin 53 does not at this time stop the turning of the ring 50 inasmuch as the camming portion 52c of the edge 52 locates, in the illustrated position of the selecting means 30, the pin 53 at the same distance from the optical axis as the slot 58. The shoulder 74 of the ring 50 of course turns with the latter, with the result that the arm 8 can follow the movement of the shoulder 74 under the influence of the spring 15 which thus turns the ring 3 and simultaneously moves the scanning member 11 downwardly, and the ring 3 continues to turn until the scanning edge 12 engages the pointer 13 and presses the latter against the support 16. As a result of the connection of the scanning member 11 to the ring 3 through the pin 10 and the bifurcated arm 9 the ring 3 cannot turn beyond the point where the scanning edge 12 presses the pointer 13 against the plate 16, and thus the angular position of the ring 3 will be determined in accordance with the lighting conditions.

During the turning of the ring 3 in this manner in the direction of the arrow a from the position shown in the drawing the portion 4a of the slot 4 cooperates with the pin 5 so as to continuously change the exposure time setting, and the exposure time will be gradually reduced as the camming slot portion 4a moves with respect to the pin 5. In the event that there is so much light available that when the exposure time has been set to its smallest value it is still necessary to reduce the amount of light which will reach the film, the camming slot portion 4b of the slot 4 will receive the pin 5 and move with respect to the latter, but the exposure time will not be changed further inasmuch as the camming slot portion 4b extends along an arc of a circle whose center is in the optical axis. At the moment when the junction between the camming slot portions 4a and 4b receives the pin 5, the end 18 of the slot 76 has reached the pin 19, so that the continued turning of the ring 3 to displace the camming slot portion 4b with respect to the pin 5 will result in turning of the ring 20 in opposition to the spring 75 also in the direction of the arrow a, and as a result the exposure aperture is continuously reduced until the ring 3 stops turning. Thus, the illustrated camera is of the type where initially, during automatic setting of the camera, the exposure time and exposure aperture have their maximum values, and the exposure time is first reduced from its maximum to its minimum value while the aperture remains at its maximum size, and subsequently while the exposure time remains at its minimum value the aperture is gradually reduced.

Toward the end of the turning of the ring 50 in the direction of the arrow c from the illustrated rest position thereof, before the pin 72 reaches the lever 73, the exposure time and exposure aperture will have been set under all conditions inasmuch as the distance through which the ring 50 turns before the pin 72 reaches the pin 73 is made large enough to provide the smallest possible combination of minimum exposure time and minimum exposure aperture. Thereupon, the ring 50 will reach its shutter-tripping position where the pin 72 actuates the lever 73 in order to trip the shutter and make the exposure, and thereupon the extension 71 will turn the lever 63 in the manner described above. If the operator has depressed the rod 60 at the relatively slow rate the lever 63 will be turned by the extension 71 by the time the pin 59 reaches the notch 66 so that the lever 63 need not necessarily come into play during automatic setting of the camera without the use of the self-timer structure. On the other hand, if the operator has to press the rod 60 so quickly that the ring 50 could not maintain the pin 69 in engagement with the portion 68 of the arm 67, then the parts will operate in exactly the same way, but the pin 59 will of course be received in the notch 66 and the rod 60 will be held in its lower end position until the extension 71 turns the rod 63 in the direction of the arrow d so as to release the pin 59 after the shutter has been tripped and then the manually operable release means will be able to be returned to its starting position by the spring 61. The return of the manually operable release means to its starting position by the spring 61 causes the portion 68 of the arm 67 by its engagement with the pin 69 to return the ring 50 in opposition to the spring 70 to the illustrated position, and of course the spring 61 is stronger than the spring 70. Any suitable stop means may be provided for limiting the upward movement of the rod 60 so as to determine the starting position of the rod 60 as well as the rest position of the control means 50. The return of the control means 50 to its rest position causes the shoulder 74 thereof by its engagement with the arm 8 to return the scanning member 11 to its starting position as well as to turn the ring 3 back to its starting position shown in the drawing, so that the maximum exposure time has again been reestablished, and of course at this time the spring 75 is free to return the diaphragm ring 20 to its starting position where the projection 25 engages the projection 26 of the ring 27. This ring 27 is of course capable of holding the ring 20 in the illustrated position thereof either by providing sufficient frictional resistance to turning of the ring 27 or by providing any suitable releasable detent structure. Once the rod 60 returns to its starting position the operator can advance the film and cock the shutter in a manner well known in the art, and then the next exposure may be made in a manner described above.

Assuming now that the operator wishes to make an exposure wherein the camera will be automatically set but wherein the self-timer will be rendered operative, then the operator will turn the manually operable selecting means 30 to the postiion where the symbol 31 is aligned with the index 36, and as a result the camming edge portion 42b engages the pin 43 to displace the self-timer means to the position where the pinion 48 engages the toothed portion 49 of the control means 50. Moreover, the camming edge portion 52a of the camming edge 52 becomes aligned with the pin 53 so that the spring 56 is capable of displacing the lever 54 in a clockwise direction, as viewed in the drawing, so as to move the pin 53 into the cutout 57 of the ring 50, so that the latter is now releasably held against turning movement by the spring 70.

When the operator now moves the manually operable release means 59, 60, 67 from the illustrated starting position thereof in the direction of the arrow b to its end position the ring 50 will not be able to follow the movement of the arm 67 and thus the rod 60 will simply move downwardly until the pin 59 is received in the notch 66 so that the lever 63 releasably holds the rod 60 in its bottom end position in the manner described above. The movement of the pin 59 to the elevation of the slot 66 places the pin 59 in engagement with the free end of the lever 54 to turn the latter in opposition to the spring 56 through a distance sufficient to place the pin 53 in alignment with the slot 58 when the pin 59 is received in the notch 66, so that simultaneously with the snapping of the lever 63 over the pin 59 to hold the latter in the slot 66 the releasable holding means 53, 54 is displaced to its release position releasing the ring 50 for movement by the spring 70, and thus the ring 50 can now turn in the direction of the arrow c, although the speed with which the ring 50 is turned by the spring 70 is necessarily retarded by the self-timer means which is driven by the toothed portion 49 of the ring 50. During this turning of the ring 50 the automatic structure will operate in exactly the manner described above to automatically set the exposure time and the exposure aperture. After the given angle of turning of the ring 50 the toothed portion 49 thereof will move beyond the pinion 48, and thereupon the pin 72 will reach the lever 73 to trip the shutter and immediately thereafter the extension 71 will turn the lever 63 to its release position releasing the pin 59 so that the parts can then return to their starting position in the manner described above. The pinion 48 is arranged coaxially with a gear of the drive 47 and is connected thereto by a suitable one-way drive which permits the pinion 48 to turn freely during the return of the ring 50 to its starting position in opposition to this spring 70, while during turning of the ring 50 in the direction of the arrow c the one-way drive transmits the turning of the pinion 48 to the gear coaxial therewith so that the self-timer means operates during turning of the ring 50 in the direction of the arrow c. Such one-way drives are well known in the art, and in this way it is possible for the ring 50 to be returned to its rest position without being retarded by the self-timer even though the toothed portion 49 will still be in engagement with the pinion 48. After these operations the film can be transported and the shutter can be cocked so that the next exposure can then be made, and if the ring 30 does not have its position changed the next exposure will also be made automatically with the use of the self-timer.

If the operator wishes to make an exposure with flash illumination while using the self-timer, then the operator will place the symbol 33 in alignment with the index 36. The turning of the selecting means 30 at this time will place the camming edge portion 42a in engagement with the pin 43 so that the pinion 48 will mesh with the toothed portion 49 and thus the self-timer structure will be rendered operative. When the symbol 33 is aligned with the index 36 the camming step 38a engages the end 39b of the lever 39 to place the end 39a thereof in engagement with the pin 41, and thus when the ring 50 turns in the direction of the arrow c from the illustrated rest position thereof under these conditions, the lever 39 will cooperate with the pin 41 to prevent the ring 3 from being turned by the spring 15 so that the ring 3 will remain in the illustrated position, where, for example, an exposure time of 1/30 sec. is provided. At this time, which is to say during operation with flash illumination, the operator manually turns the ring 27 so as to set the exposure aperture. Because the lever 39 by cooperation with the pin 41 prevents turning of the ring 3 in the direction of the arrow a, when the ring 50 is turned by the spring 70 the shoulder 74 will simply move downwardly away from the arm 8 which will not follow the shoulder 74 at this time. The depression of the rod 60 will again release the ring 50 to the spring 70, as soon as the pin 59 turns the lever 54 so as to displace the pin 53 out of the cutout 57, and of course the pin 59 will be held in the notch 66 of the lever 63 in the manner described above. It should be noted that at this time the camming edge portion 52b is aligned with the pin 53 so that the latter is free to be moved into the cutout 57 by the spring 56 and thus the ring 50 is restrained against being turned by the spring 70 until the pin 59 moves the lever 54 in opposition to the spring 56. The exposure is made in the manner described above with the turning of the ring 50 being retarded by the self-timer, and when the pin 72 reaches the lever 73 the shutter will be tripped and immediately thereafter the extension 71 will actuate the lever 63 to release the pin 59 so that the spring 61 can return the rod 60 to its starting position.

In order to make an exposure with flash illumination or with a bulb exposure, without the use of the self-timer, the operator will place the symbol 34 in alignment with the index 36, to provide an exposure with flash illumination but without the self-timer, or the operator will place the symbol 35 in alignment with the index 36, to provide a bulb exposure. In each of these latter positions of the ring 30 the edge portion 42c' becomes aligned with the pin 43 so that the spring 44 can displace the self-timer to the illustrated inoperative position thereof where the ring 48 does not mesh with the toothed portion 49 of the ring 50. When the symbol 34 is aligned with the index 36 the camming step 38a remains in engagement with the lever 39 so that the ring 3 is still maintained in its starting position providing an exposure time on the order of 1/30 sec., for example, and the operations are exactly the same as those described above in connection with the location of the symbol 33 in alignment with the index 36, except, of course, that at this time the self-timer does not operate. On the other hand, when the operator locates the symbol 35 in alignment with the index 36, the camming step 38b will engage the lever 39 and will positively turn the latter in a clockwise direction, as viewed in the drawing, so that the lever 39 will turn through the pin 41 the ring 3 in a counterclockwise direction, as viewed in the drawing, so as to locate the enlarged end portion 6a of the slot 6 in alignment with the lever 7 which is then free to move to the position for providing a bulb exposure in a manner well known in the art. As soon as the ring 30 is turned in a counterclockwise direction, as viewed in the drawing, from the position where the symbol 35 is aligned with the index 36, the spring 15 turns the ring 3 so that the pin 41 follows the lever 39 and of course further movement of the ring 3 is limited by engagement of the arm 8 with the shoulder 74. The spring 61 is of course stronger than the total of the forces of the springs 70 and 15.

Of course, the invention described above may be varied in some respects. For example, it is possible to eliminate the releasable holding means 53, 54, 57 in the event that the self-timer structure has a relatively long retarding time which would be longer than the retarding time provided by the illustrated self-timer. Moreover, it is possible to eliminate also the manually turnable ring 27 for manually setting the aperture. Instead the symbols 33 and 34 could be located at a greater distance from each other and in the region between these symbols could be located apertures sizes on the ring 30, and such a scale of aperture sizes could be aligned directly with the index 36, but in this case it would be necessary for the ring 30 to be coupled to the diaphragm ring 20 with a known structure which would provide coupling and uncoupling between the ring 30 and the ring 20 when the portion of the ring 30 between the symbols 33 and 34 was aligned with the index 36.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera capable of being operated in a plurality of different ways, in combination, control means movable from a given rest position through a given distance to a position where said control means trips the shutter of the camera to make an exposure; manually operable release means cooperating with said control means for releasing the latter for movement from said rest position thereof to said position where said control means trips said shutter; self-timer means; support means supporting said self-timer means for movement between an inoperative position of said support means where said self-timer means is spaced from said control means to an operative position of said support means where said self-timer means is operatively connected to said control means, said control means driving said self-timer means, when the latter is in said operative position thereof, during movement of said control means from said rest position thereof to said shutter-tripping position thereof; urging means permanently tending to move said support means from operative into inoperative position; and manually operable selecting means for selecting one of a plurality of different types of operation, said selecting means having a moving portion cooperating with said support means supporting said self-timer means for moving said support means together with said self-timer means against action of said urging means from said inoperative into said operative position thereof in accordance with a selected position of said manually operable selecting means whereby upon movement of said selecting means into said selected position said support means together with said self-timer means will be moved against action of said urging means into said selected position wherein said self-timer means is operatively connected to said control means and whereby upon movement of said selecting means into another position said urging means will automatically move said support means from said operative into said inoperative position thereof with said self-timer means spaced from said control means.

2. In a camera capable of being operated in a plurality of different ways, in combination, control means movable from a given rest position through a given distance to a position where said control means trips the shutter of the camera to make an exposure; manually operable release means cooperating with said control means for releasing the latter for movement from said rest position thereof to said position where said control means trips said shutter; self-timer means; support means supporting said self-timer means for movement between an inoperative position where said self-timer means is spaced from said control means to an operative position where said self-timer means is operatively connected to said control means to be driven by the latter during movement of said control means from said rest position thereof to said shutter-tripping position thereof; manually operable selecting means for selecting one of a plurality of different types of operation, said selecting means having a camming portion cooperating with said self-timer means for placing the latter either in said operative or in said inoperative position thereof in accordance with the selected position of said manually operable selecting means; first spring means urging a portion of said control means into engagement with a portion of said manually operable release means, said first spring means urging said control means to move from said rest to said shutter-tripping position thereof; and second spring means, stronger than said first spring means, urging said manually operable release means to a given rest position where said release means holds said control means in opposition to said first spring means in said rest position thereof, whereby when the operator moves said manually operable release means in opposition to said second spring means for said rest position of said manually operable release means said first spring means will move said control means from said rest position thereof to said shutter-tripping position thereof.

3. In a camera, in combination, control means movable from a given rest position through a given distance to a shutter-tripping position where said control means trips the shutter of the camera to make an exposure; manually operable release means cooperating with said control means for releasing the latter for movement from said rest to said shutter-tripping position thereof; spring means urging said manually operable release means to a given starting position where said release means holds said control means in said rest position thereof, said manually operable release means being moved from said starting position thereof in opposition to said spring means to a given end position to release said control means; releasable holding means releasably holding said manually operable release means in said end position thereof in opposition to said spring means, said control means after reaching said shutter-tripping position thereof actuating said releasable holding means to move the latter to a position releasing said manually operable release means for return by said spring means to said starting position thereof, and said manually operable release means during return movement to said starting position thereof returning said control means to said rest position thereof; self-timer means movable between an inoperative position spaced from said control means and an operative position engaging said control means to be driven thereby during movement of said control means from said rest to said shutter-tripping position thereof; and manually operable selecting means for selecting different types of camera operation, said selecting means cooperating with said self-timer means for moving the latter between said positions thereof when said manually operable selecting means is placed by the operator in different positions thereof.

4. In a camera capable of being operated in a plurality of different ways, in combination, control means movable from a given rest position through a given distance to a shutter-tripping position; manually operable release means cooperating with said control means for releasing the latter for movement from said rest to said shutter-tripping position thereof; releasable holding means cooperating with said control means for releasably holding the latter from movement from said rest to said shutter-tripping position thereof, said releasable holding means being movable between a holding position and a release position; self-timer means movable between an inoperative position spaced from said control means and an operative position cooperating with said control means to be driven thereby during movement of said control means from said rest to said shutter-tripping position thereof; manually operable selecting means for selecting one of a plurality of different types of camera operation, said selecting means cooperating with said self-timer means for moving the latter between said positions thereof, and said selecting means as well as said manually operable release means cooperating with said releasable holding means for locating the latter in said release position thereof, said manually operable release means displacing said releasable holding means from said holding to said release position thereof in the event that said manually operable selecting means has not already placed said releasable holding means in said release position thereof.

5. In a camera as recited in claim 4, said releasable holding means including a lever turnable about a given axis and carrying a pin, a spring urging said lever to turn in a given direction about said axis, and said control means having a portion formed with a cutout which receives said pin when said releasable holding means is in said holding position thereof, said manually operable release means having a portion which engages said lever and turns the latter to displace said pin from said cutout so as to release said control means by placing said releasable holding means in said release position thereof, and said manually operable selecting means having a camming portion which in a given position of said manually operable selecting means engages said pin to also displace said lever to a position locating said pin out of said cutout so that said selecting means also can place said releasable holding means in said release position thereof.

6. In a camera capable of being operated in a number of different ways, in combination, control means movable from a given rest position through a given distance to a shutter-tripping position, said control means having a toothed portion which moves with said control means between said positions thereof; self-timer means supported for movement between operative and inoperative positions, said self-timer means being spaced from said control means in said inoperative position thereof and said self-timer means when in said operative position thereof having a gear which meshes with said toothed portion of said control means so that the latter drives said self-timer means during movement of said control means from said rest to said shutter-tripping position thereof when said self-timer means is in said operative position thereof; and manually operable selecting means cooperating with said self-timer means for selectively placing the latter in said operative or in said inoperative position thereof, said self-timer means including a plate which is supported for turning movement and which carries the remainder of said self-timer means, said plate also carrying a pin and said self-timer means being urged by a spring to said inoperative position thereof, and said manually operable selecting means having a camming portion cooperating with said pin for displacing the latter and said plate therewith so as to move said self-timer means between said positions thereof.

7. In a camera capable of being operated in a number of different ways, in combination, control means movable from a rest position through a given distance to a shutter-tripping position; manually operable release means releasing said control means for movement from said rest to said shutter-tripping position thereof; automatic means for automatically setting the exposure time and exposure aperture of the camera, said automatic means being released for automatically setting the camera upon movement of said control means from said rest to said shutter-tripping position thereof; self-timer means movable between an inoperative position spaced from said control means and an operative position engaging said control means, said control means driving said self-timer means, when the latter is in said operative position thereof, during movement of said control means from said rest to said shutter-tripping position thereof; and manually operable selecting means for selecting one of a plurality of different types of camera operation, said selecting means engaging said self-timer means for moving the latter between said positions thereof in accordance with the type of operation selected by said selecting means, whereby the camera may be automatically operated either with or without the self-timer means according to the position of the selecting means.

8. In a camera capable of being operated in a number of different ways, in combination, control means movable from a rest position through a given distance to a shutter-tripping position; manually operable release means releasing said control means for movement from said rest to said shutter-tripping position thereof; automatic means for automatically setting the exposure time and exposure aperture of the camera, said automatic means being released for automatically setting the camera upon movement of said control means from said rest to said shutter-tripping position thereof; self-timer means movable between an inoperative position spaced from said control means and an operative position engaging said control means, said control means driving said self-timer means, when the latter is in said operative position thereof, during movement of said control means from said rest to said shutter-tripping position thereof; and manually operable selecting means cooperating with said self-timer means for moving the latter between said positions thereof, whereby the camera may be automatically operated either with or without the self-timer means according to the position of the selecting means, said selecting means also having positions for flash operation of the camera, and when in position for providing exposure with flash operation, said selecting means cooperating with said automatic means for preventing operation thereof.

References Cited by the Examiner
UNITED STATES PATENTS

| | | | |
|---|---|---|---|
| 3,007,387 | 11/61 | Rentschler | 95—53.3 X |
| 3,008,395 | 11/61 | Ieda | 95—53.3 X |
| 3,016,811 | 1/62 | Bundschuh | 95—10 |
| 3,018,705 | 1/62 | Morelle | 95—10 |

JOHN M. HORAN, *Primary Examiner.*

NORTON ANSHER, *Examiner.*